Patented Jan. 8, 1924.

1,480,376

UNITED STATES PATENT OFFICE.

ROBERT C. DABNEY, OF AKRON, OHIO, ASSIGNOR TO THE MILLER RUBBER COMPANY, OF AKRON, OHIO, A CORPORATION OF OHIO.

METHOD OF FORMING HOLLOW INFLATED RUBBER ARTICLES.

No Drawing. Application filed March 29, 1923. Serial No. 628,565.

*To all whom it may concern:*

Be it known that I, ROBERT C. DABNEY, a citizen of the United States, and resident of Akron, in the county of Summit and State of Ohio, have invented certain new and useful Improvements in Methods of Forming Hollow Inflated Rubber Articles, of which the following is specification.

My present invention relates to the manufacture of inflated hollow rubber articles, such for example as hollow rubber balls.

It is well known that such articles can be inflated by means of a blower during the molding process and that such balls when properly made will retain the gas for a long time, and if the gas forming materials are properly selected and accurately weighed, the balls will be uniform in size and shape.

Experience has shown that a mixture of sodium nitrite and ammonium chloride and water will evolve nitrogen which is very satisfactory for the purpose, but great difficulties are encountered in attempting to use this mixture on a commercial scale.

A mixture of the two chemicals without the water may be distributed into the partially formed articles provided the material is kept dry, but such dry material evolves the gas too slowly and a small amount of water must be measured into the article after the blower is in place. A wet mixture is very difficult to accurately measure and weigh and the water is also difficult to measure carefully under commercial production.

According to the present invention I introduce a dry mixture, such as sodium nitrite and ammonium chloride, and an inactive material containing water of crystallization, which water will be released at the proper temperature. As the water of crystallization is of known amount the material may be weighed out and the water content is accurately determined.

In practicing this invention, I preferably use hydrated magnesium sulphate as this salt has such a vapor pressure as to make it stable at working temperatures. This salt is dry and when mixed with sodium nitrite and ammonium chloride, forms a perfectly dry mixture which can be fed into the partially formed articles by automatic machinery. At vulcanizing temperatures the hydrated salt releases its water of crystallization, which attacks the other chemicals and brings them into solution whereupon evolution of gas takes place.

It will be understood that I do not limit myself to sodium nitrite and ammonium chloride as the gas forming ingredients, nor do I limit myself to hydrated magnesium sulphate as the water supplying material, as other ingredients could be used to secure the same effect. For example I may use sodium borate (borax) in place of the magnesium sulphate.

In damp climates or seasons, the mixture might be sufficiently hygroscopic to make weighing and handling difficult. I find this objection can be overcome by the introduction of some inert material which will protect the chemicals from the air. For example, I have found that zinc stearate incorporated in the mixture will coat or protect the ingredients in such a manner as to prevent their being affected detrimentally by the action of the moisture in the air. Other protecting materials might be substituted for the zinc stearate, as for example finely ground or comminuted clay.

Having thus described my invention, what I claim is:—

1. The hereindescribed method of expanding hollow rubber articles during vulcanization, which consists in introducing into the hollow rubber article before vulcanization a dry mixture containing ingredients which will react in the presence of water to form a gas when heated, and containing also an ingredient containing water of crystallization which when heated will supply the necessary water.

2. The hereindescribed method of expanding hollow rubber articles during vulcanization which consists in introducing into the hollow article during formation, a mixture containing sodium nitrite, ammonium chloride, and a salt containing water of crystallization, and thereafter heating the article.

3. The hereindescribed method of expanding hollow rubber articles during vulcanization which consists in introducing into the hollow article during formation, a mixture containing sodium nitrite, ammonium chloride, and hydrated magnesium chloride, and thereafter heating the article.

4. The hereindescribed method of expanding hollow rubber articles during vulcanization, which consists in introducing into the hollow rubber article before vulcanization a dry mixture containing ingredients which will react in the presence of water to form a gas when heated, and containing also an ingredient containing water of crystallization which when heated will supply the necessary water, and an inert ingredient which will protect the mixture from the action of moisture in the atmosphere.

In testimony whereof, I affix my signature.

ROBERT C. DABNEY.